US006810969B2

(12) United States Patent
Meixner

(10) Patent No.: US 6,810,969 B2
(45) Date of Patent: Nov. 2, 2004

(54) HAND MACHINE TOOL

(75) Inventor: Gerhard Meixner, Filderstadt (DE)

(73) Assignee: Robert Bosch GmbH, Stuttgart (DE)

(*) Notice: Subject to any disclaimer, the term of this patent is extended or adjusted under 35 U.S.C. 154(b) by 42 days.

(21) Appl. No.: 10/311,130

(22) PCT Filed: Feb. 27, 2002

(86) PCT No.: PCT/DE02/00718

§ 371 (c)(1), (2), (4) Date: Dec. 13, 2002

(87) PCT Pub. No.: WO02/092291

PCT Pub. Date: Nov. 21, 2002

(65) Prior Publication Data

US 2003/0178213 A1 Sep. 25, 2003

(30) Foreign Application Priority Data

May 11, 2001 (DE) ........................................ 101 22 820

(51) Int. Cl.[7] ................................................ B23B 45/00

(52) U.S. Cl. ....................... 173/201; 173/104; 173/200; 173/210; 173/211

(58) Field of Search .......................... 173/48, 104, 109, 173/200, 201, 210, 211

(56) References Cited

U.S. PATENT DOCUMENTS

| | | | | |
|---|---|---|---|---|
| 3,456,740 A | * | 7/1969 | Bronnert et al. | 173/109 |
| 3,847,229 A | * | 11/1974 | Wanner et al. | 173/48 |
| 5,050,687 A | | 9/1991 | Prokhorov | |
| 5,201,373 A | * | 4/1993 | Bloechle | 173/109 |
| 6,116,352 A | * | 9/2000 | Frauhammer et al. | 173/212 |

FOREIGN PATENT DOCUMENTS

| | | |
|---|---|---|
| DE | 12 83 769 B | 11/1968 |
| DE | 35 11 491 A | 10/1986 |
| DE | 199 33 972 A | 1/2001 |
| EP | 0 884 138 A | 12/1998 |
| FR | 2 412 391 A | 7/1979 |

* cited by examiner

*Primary Examiner*—Stephen F. Gerrity
*Assistant Examiner*—Nathaniel Chukwurah
(74) *Attorney, Agent, or Firm*—Michael J. Striker

(57) ABSTRACT

The invention is based on a hand power tool, in particular a drilling- and/or chipping hammer, having a machine housing (12), a tool guiding element (16; 54), a hammer tube (14; 52), and a safety catch (32)—fixed in the housing in stationary fashion in the axial direction—for a striker (24) that can be driven by means of a drive piston (22) and that is actively joined with a tool (20) situated in a tool guiding element (16; 54).

It is proposed that the tool guiding element (16; 54) is designed to be axially displaceable in relation to the machine housing (12).

9 Claims, 2 Drawing Sheets

HAND MACHINE TOOL

BACKGROUND OF THE INVENTION

The invention is based on a hand power tool, in particular a drilling-and/or chipping hammer.

A hand power tool of this type is known in practice and is developed as a drilling hammer, for example, that comprises a hammer tube situated in a machine housing, in which said hammer tube a drive piston developed as a pot-type piston is guided. The pot-type piston is coupled via an air cushion with a "striker" which, in turn, is actively connected with a punch dolly for driving a tool situated in a tool guiding element, which said tool is developed as a drill bit, for example. "Drive teeth" with which the tool meshes are formed on the tool guiding element.

The drilling hammer has an idle position and an operating/striking position. In the idle position, the tool, the punch dolly, and the striker are situated in a "forward" position. The striker is held by a safety catch. In the operating position, in which the tool is placed on a surface to be worked, for example, the tool is subjected to axial pressure, so that the entirety composed of the tool, the punch dolly, and the striker are moved into a "rear" position, and "idle openings" in the pot-type piston are closed by the striker. As a result, a compressed air cushion forms between the pot-type piston and the striker, by means of which movement of the pot-type piston is transferred to the striker and, therefore, to the punch dolly and the tool.

In the case of the known drilling hammer, the tool guiding element and the safety catch are each fixed in stationary fashion in the housing in the axial direction, so that, during transition from the idle position to the operating position, or from the operating position to the idle position, relative motion takes place between the tool guiding element and the tool.

SUMMARY OF THE INVENTION

The invention is based on a hand power tool, in particular a drilling- and/or chipping hammer, having a machine housing, a tool guiding element, a hammer tube, and a safety catch—fixed in stationary fashion in the housing in the axial direction—for a striker that can be driven by means of a drive piston and that is actively joined with a tool situated in the tool guiding element.

It is proposed that the tool guiding element is designed so that it is axially displaceable in relation to the machine housing. During transition from the idle position to the operating position, or from the operating position to the idle position, axial displacement of the tool and axial displacement of the tool guiding element can take place. The relative motion between the tool and the tool guiding element can be kept to a minimum. Operation-induced wear in the joint region between these two components is therefore minimal which, in turn, results in a long service life of the components. In particular when the tool guiding element is turnably supported and comprises drive teeth for the tool, a large tooth contact surface area can be realized between the tool and the tool guiding element in the direction of rotation. This results in a slight surface pressure, which, in turn, has a favorable effect on wear.

A compression spring is a cost-effective means for setting the idle position of the tool guiding element, by means of which the tool guiding element is preloaded in the direction of the tool.

According to a preferred embodiment of the hand power tool according to the invention, the tool guiding element is designed integral with the hammer tube. This results in a reduced number of components and, therefore, to reduced installation expense. The assembly comprising the tool guiding element and the hammer tube is then designed to be axially displaceable, so that, during transition from the idle position to the operating position, or from the operating position into the idle position, the hammer tube also undergoes axial displacement. In this exemplary embodiment, the compression spring can act directly on the hammer tube or on the tool guiding element.

In order for the safety catch to follow a rotation of the tool guiding element or the hammer tube, the safety catch is advantageously supported in a guide ring fixed in the housing in stationary fashion. Particularly when the tool guiding element and the hammer tube are designed as a single component, the safety catch is supported axially in the housing in stationary fashion, without negatively affecting the rotation of the hammer tube.

A pin associated with the safety catch and that meshes with the guide ring is a structurally simple means of attaining the object for guiding the safety catch in the guide ring. In order to drive the pin when the hammer tube rotates, said pin advantageously passes through a slot in the hammer tube that extends in the axial direction.

In the case of an alternative exemplary embodiment, in which the tool guiding element and the hammer tube are designed as at least two components, the safety catch can be fastened to the hammer tube that is joined with the machine housing. In this exemplary embodiment, the hammer tube and the safety catch are fixed in the housing in stationary fashion in the axial direction. The tool guiding element can be replaced individually if it becomes worn.

In order to obtain a good start-up behavior of the hand power tool according to the invention, the drive piston is advantageously designed as a pot-type piston. This is of particular advantage in the case of heavy drilling- and/or chipping hammers. It is also feasible, however, to design the drive piston as a cylindrical piston.

So that the striker is always guided securely in the pot-type piston, the safety catch can extend into the pot-type piston. In this case, the safety catch serves as a stop for the striker when it is displaced in the pot-type piston.

Further advantages result from the following description of the drawing. Exemplary embodiments of the invention are presented in the drawings. The drawings, the description, and the claims contain numerous features in combination. One skilled in the art will advantageously consider them individually as well and combine them into reasonable further combinations.

DESCRIPTION OF THE PREFERRED EMBODIMENTS

Figure 1:
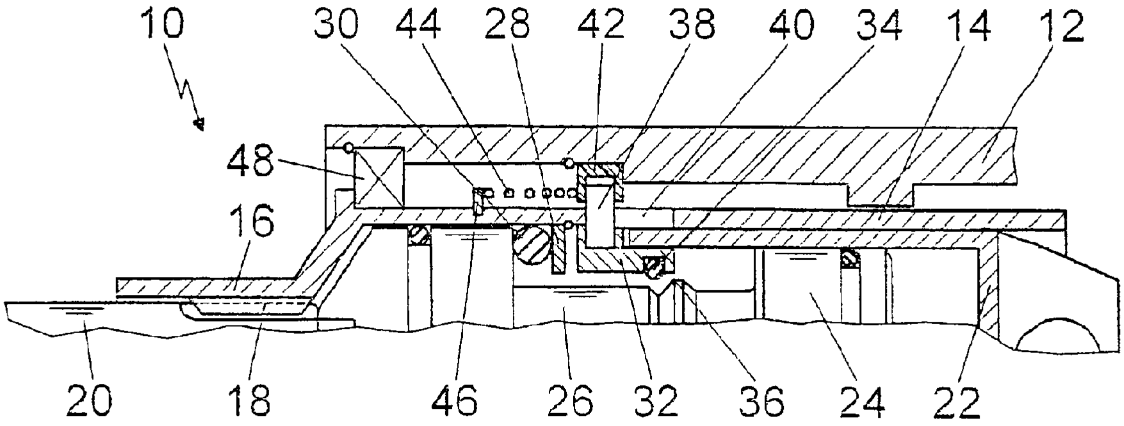
FIG. 1 shows a schematic longitudinal view through a drilling hammer in the operating position.
Figure 2:
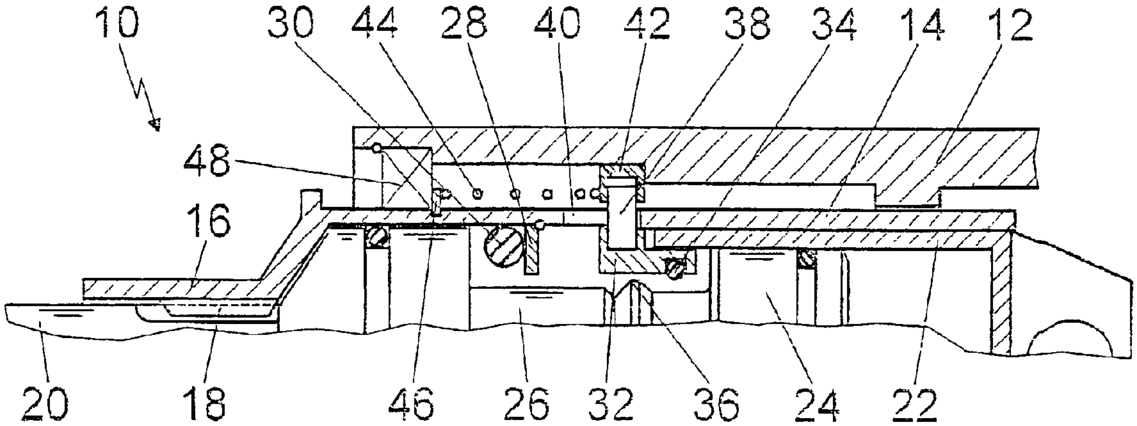
FIG. 2 shows the drilling hammer according to FIG. 1 in the idle position.

A schematic drawing of a drilling hammer 10 is shown in FIGS. 1 and 2 that is capable of being driving by a not-further-shown electric motor and that comprises a "pot-type piston striking mechanism". FIG. 1 shows the drilling hammer 10 in the operating position, i.e., in the striking position, and FIG. 2 shows the drilling hammer 10 in the idle position.

The drilling hammer 10 comprises a machine housing 12 in which a hammer tube 14 is supported in axially moveable and turnable fashion, which said hammer tube is designed integral with a tool guiding element 16. The anterior region of the hammer tube 14 is supported via a sliding bearing 48 in the housing 12. Drive teeth 18 for an impact drilling tool 20 are developed on the tool guiding element 16, which is designed to be axially displaceable. The hammer tube 14 and, therefore, the tool guiding element 16, are turnably supported in the machine housing 12.

A pot-type piston 22, a striker 24, and a punch dolly 26 are guided in the hammer tube 14 in known fashion. The punch dolly 26 serves to transfer pulses to the tool 20. The axial motional play of the punch dolly 26 is limited by means of a rubber O-ring 30 bearing against an end bearing 28, which said O-ring serves to drive the hammer tube 14 when pressure is exerted axially on the tool 20 in the direction of the pot-type piston 22, so that the punch dolly 26 is displaced by the tool 20, and the hammer tube 14 and/or the tool guiding element 16 is displaced via the O-ring 30 by the punch dolly 26 in the direction of the pot-type piston 22. In the operating position, the punch dolly 26 is pressed against the O-ring 30, as shown in FIG. 1.

In order to hold the striker 24 in the idle position shown in FIG. 2, a safety catch 32 is further equipped with a catch ring 34 inside the hammer tube 14, which said safety catch extends into the pot-type piston 22 on its open side in the axial direction, and interacts with a ring collar 36 of the striker 24. The safety catch 32 is fixed in the housing in stationary fashion in the axial direction. The safety catch 32 encloses a straight pin 38 that passes through an axially-positioned slot 40 in the hammer tube 14 and engages with a guide ring 42 acting as support for the safety catch 32, which said guide ring is fastened to the machine housing 12. When the hammer tube 14 rotates, the straight pin 38 is guided in the guide ring 42 in the circumferential direction.

A compression spring 44 acts on the guide ring 42, which said compression spring acts on the hammer tube 14 via an end bearing 46 and preloads it in the direction of the tool 20, i.e., in the idle position. The end bearing 46 is moveably supported in the circumferential direction in an annular groove of the hammer tube 14 and is fixed in the housing in stationary fashion in the circumferential direction in relation to the machine housing 12.

Figure 3:
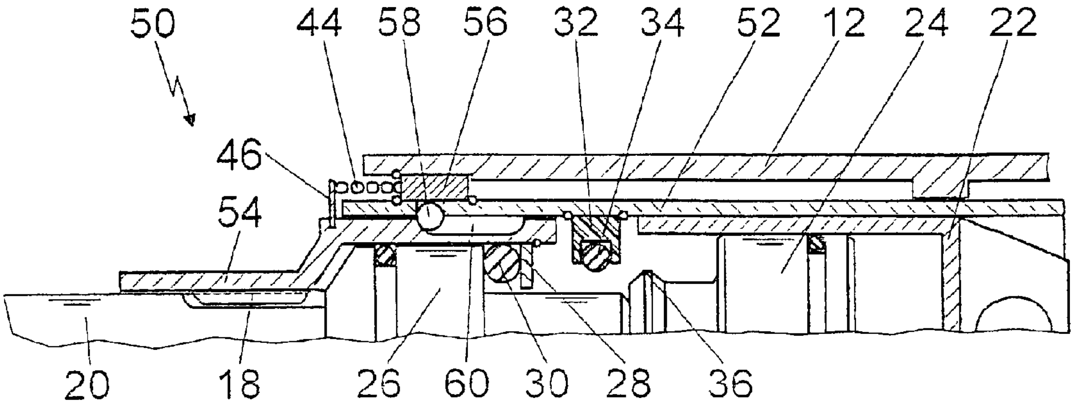
FIG. 3 shows a schematic longitudinal view through an alternative exemplary embodiment of a drilling hammer in the operating position.
Figure 4:
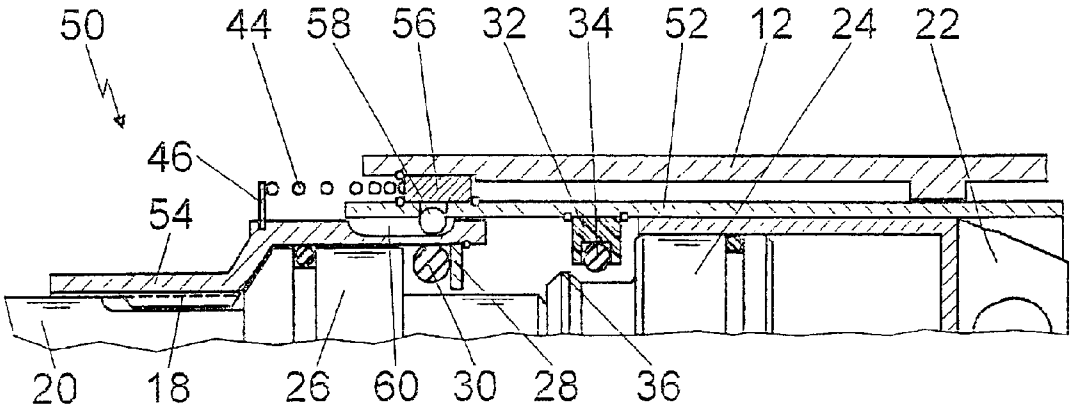
FIG. 4 shows the drilling hammer according to FIG. 3 in the idle position.

A chipping hammer 50 is shown in FIGS. 3 and 4. Components that are essentially the same are labelled with the same reference numerals in the exemplary embodiments. Moreover, the description of the exemplary embodiment according to FIGS. 1 and 2 can be referred to with regard for identical features and functions.

The chipping hammer 50, the operating position of which is shown in FIG. 3, and the idle position of which is shown in FIG. 4, differs from the drilling hammer according to FIGS. 1 and 2 in that it has a hammer tube 52 and a tool guiding element 54 that are developed as two components. Moreover, the chipping hammer 50 does not have a rotary actuator of the tool guiding element 54 and/or the hammer tube 52.

A safety catch 32 with a catch ring 34 is fastened to the inner wall of the hammer tube 52, which said safety catch interacts with a ring collar 36 of a striker 24. The hammer tube 52 is permanently joined with a machine housing 12 via a connecting element 56, so that the safety catch 32 is fixed in the housing in stationary fashion in the axial direction.

A compression spring 44 that bears against an end bearing 46 supported in an annular groove of the tool guiding element 54 and preloads the tool guiding element 54 in the direction of the idle position acts on the connecting element 56.

The tool guiding element 54 is guided in the hammer tube 52 in axially moveable fashion and is therefore designed to be axially displaceable in relation to the machine housing 12. The axial motional play of the tool guiding element 54 in relation to the hammer tube 52 is determined by a longitudinal groove 60 that is developed in the outer wall of the tool guiding element 54, and in which a ball 58 engages that is held in a through hole in the hammer tube 52. The through hole is covered radially outwardly by the connecting element 56.

A punch dolly 26 is guided in the tool guiding element 54, which said punch dolly interacts via drive teeth 18 with a tool 20 fastened in the tool guiding element 54, and with an O-ring 30 bearing against an end bearing 28 to displace the tool guiding element 54 in the axial direction. The punch dolly 26 can be operated by means of the striker 24 driveable via a pot-type piston 22. Instead of that which is shown in the exemplary embodiments, the hammer tube and the tool guiding element could also be developed as two components in the case of a drilling hammer and, in the case of a chipping hammer, the hammer tube and the guiding element could be developed as a single component.

Reference Numerals

10 Drilling hammer
12 Housing
14 Hammer tube
16 Tool guiding element
18 Drive teeth
20 Tool
22 Pot-type piston
24 Striker
26 Punch dolly
28 End bearing
30 O-ring
32 Safety catch
34 Catch ring
36 Ring collar
38 Straight pin
40 Slot
42 Guide ring
44 Compression spring
46 End bearing
48 Sliding bearing
50 Chipping hammer
52 Hammer tube
54 Tool guiding element
56 Connecting element
58 Ball
60 Longitudinal groove

What is claimed is:

1. A hand power tool selected from the group consisting of a drilling hammer, a chipping hammer, and both, having a machine housing (12), a tool guiding element (16; 54), a hammer tube (14, 52), and a safety catch (32) fixed in the housing in stationary fashion in the axial direction for a striker (24) that is driveable by means of a drive piston (22) and that is cooperatable with a tool (20) situated in the tool guiding element (16; 54), wherein the tool guiding element (16; 54) is designed to be axially displaceable in relation to the machine housing (12).

2. The hand power tool according to claim 1, wherein the tool guiding element (16; 54) is preloaded by means of a compression spring (44) in the direction of the tool (20).

3. The hand power tool according to claim 1, wherein the tool guiding element (16) is designed integral with the hammer tube (14).

4. The hand power tool according to claim 1, wherein the safety catch (32) is supported in a guide ring (42) fixed in the housing in stationary fashion.

5. The hand power tool according to claim 4, wherein the safety catch (32) encloses a pin (38) that engages with the guide ring (42).

6. The hand power tool according to claim 5, wherein the pin (38) passes through a slot (40) in the hammer tube (14).

7. The hand power tool according to claim 1, wherein the safety catch (32) is fastened to the hammer tube (52), which is interconnected with the machine housing (12).

8. The hand power tool according to claim 1, wherein the drive piston is a pot-type piston (22).

9. The hand power tool according to claim 8, wherein the safety catch (32) extends into the pot-type piston (22).

* * * * *